March 14, 1933.    B. DICK    1,901,088

METHOD OF MAKING HOSE CONNECTIONS

Filed Oct. 6, 1930

Inventor
BURNS DICK

By *E. E. Huffman,*
Att'y.

Patented Mar. 14, 1933

1,901,088

UNITED STATES PATENT OFFICE

BURNS DICK, OF FERGUSON, MISSOURI, ASSIGNOR TO WAGNER ELECTRIC CORPORATION, OF ST. LOUIS, MISSOURI, A CORPORATION OF DELAWARE

METHOD OF MAKING HOSE CONNECTIONS

Application filed October 6, 1930. Serial No. 486,679.

My invention relates to a hose fitting for application to the end of a hose embodying rubber or other compressible material, its object being to provide means for producing a connection between the hose and the fitting which will be fluid-tight under high pressure without requiring the employment of an excessive amount of material.

My invention constitutes an improvement in the relevant prior art, known to me, in the matter of preventing leakage of fluid through the weaving (fabric or wire) of the hose, and also in reducing the length of joint required to withstand a selected fluid pressure.

Figure 1:
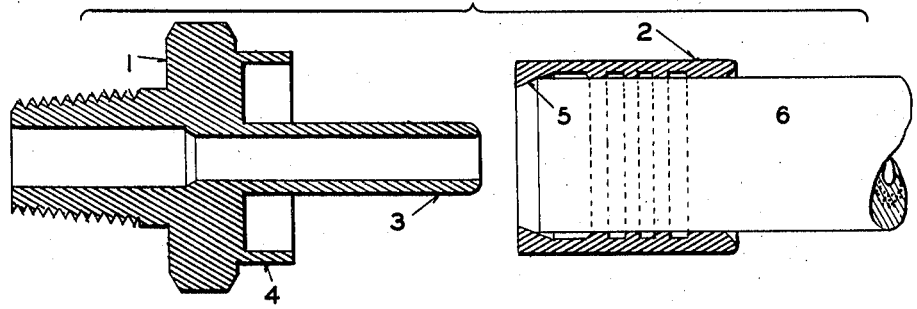
Figure 2:
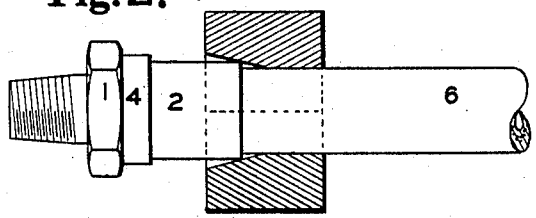
Figure 3:
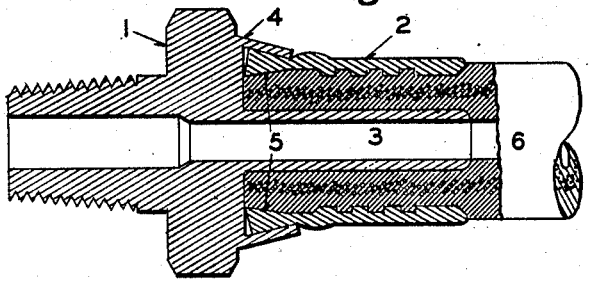
Figure 4:
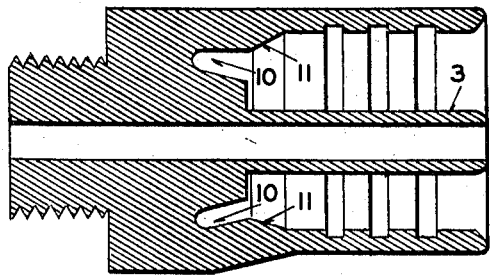

In the accompanying drawing Figure 1 illustrates, in cross section, the elements of the preferred form of my improved hose fitting as initially formed; Figure 2 illustrates a method and means for permanently securing the parts in their final relation; Figure 3 is a cross sectional view of the completed assembly of the hose and fitting; and Figure 4 illustrates a modified embodiment of my invention.

Referring to Figures 1 and 3, my improved fitting comprises the main fitting member 1 and an unsplit sleeve 2 to embrace the end of the hose 6. The member 1 consists of a body having a central tubular extension or nipple 3 and an outer short tubular extension 4 within which the end of the sleeve 2 is received.

The sleeve 2 is tubular and its internal diameter approximates the normal diameter of the uncompressed hose end to be received by it except that the end 5 of the sleeve embracing the extremity of the hose is of somewhat reduced diameter and is preferably tapered, as shown. The sleeve is also provided with internal circumferential grooves for gripping the hose surface after compression of the sleeve.

My reason for making the portion of the sleeve just referred to of smaller internal diameter than the normal external diameter of the hose is I have noted that when a length of hose as manufactured is cut into sections the tension of the fabric or wire threads which constitute the weaving is somewhat relieved at the cut, which results in a slight linear motion of parts of the material and, therefore, less density at the extremity. By making the initial diameter of the sleeve smaller at the end than the uncompressed external diameter of the hose and also by inwardly tapering this portion I secure the desirable result hereinafter described.

To assemble the parts, the sleeve is placed over the hose in the position indicated in Figure 1, and then the tubular nipple 3 of the main fitting member is inserted into the bore of the hose and the end of the hose and sleeve are brought against the side of the body portion of the fitting, the outer diameter of the sleeve end being such that it fits within the cylindrical extension 4 of the fitting. A two-part reducing die is then placed around the hose, as illustrated in Figure 3, and the sleeve and the fitting are forced into the die, thereby reducing the diameter of the sleeve and compressing the material of the hose between the sleeve and the nipple. The final portion of the movement of the fitting into the die bends the cylindrical extension 4 over the forward end of the sleeve in the manner shown in Figure 3, and at the same time also radially reduces the diameter of the outer end of the sleeve as indicated in the figure. In view of the excess thickness of the sleeve wall at the end the die action results in a very firm compression of the material at the extreme end of the hose in addition to the other portions and thus produces a firm contact between the inner rubber layer of the hose and the nipple throughout the entire length of their engagement. Thus I avoid the condition which has heretofore arisen in the use of high liquid pressures in hose having a coupling provided with an internal nipple and an external sleeve, that the liquid has often passed between the nipple and the hose and then back through the weaving of the hose to a point beyond the sleeve where it burst through. In prior couplings similar to mine it has been proposed to provide a laterally enlarged space adjacent the coupling body into which the material of the hose was supposed to "flow" sufficiently during the die compressing operation to build up pressure between the inner wall of the hose and the nipple at this point, but experience indicates that deformation of this kind cannot be relied upon to place the hose material under high pressure at the enlargement. By making the shell of the initial dimensions relative to the hose herein described, I am enabled to positively secure high pressure between the extremity of the hose and the adjacent parts and to so reduce the volume of the hose material at this point that any lateral movement of the inner hose wall which would be necessary to allow liquid to pass between it and the nipple, will be resisted as much at this point as at any other.

Figure 4 illustrates a modified embodiment of my invention wherein the hose embracing shell is integral with the body of the fitting, and an annular groove 10 is provided which permits the die to deform the shell portion of the fitting to bring it from original position (indicated in the upper half of the figure) into final position (indicated in the lower half of the figure) whereby the tapered portion 11 of the sleeve, which receives the extremity of the hose, is brought closer to the nipple during the compressing operation to develop the desired pressure on the extremity of the hose.

Having fully described my invention, what I claim as new and desire to secure by United States Letters Patent is:

1. The method of making pressure-tight connection between a hose of compressible material and a fitting member, which comprises placing a tubular sleeve of ductile material around the hose end and a cylindrical nipple in the end of the hose, said hose end and sleeve abutting the fitting member and said sleeve being of substantially the same internal diameter as the normal external diameter of the hose except as to the part receiving the extremity of the hose, which part is of smaller diameter than the hose diameter, and then progressively compressing the sleeve from its open end toward the fitting member and throughout substantially its entire length.

2. The method of making pressure-tight connection between a hose of compressible material and a fitting member, which comprises placing a sleeve of ductile material around the hose end and a nipple in the end of the hose, said hose end and sleeve abutting the fitting member and said nipple and sleeve having such relative dimensions that the clearance between them opposite the extremity of the hose is less than at other portions, and then progressively reducing the bore of the sleeve from its open end toward the fitting member and throughout substantially its entire length.

In testimony whereof, I hereunto affix my signature, this 1st day of October, 1930.

BURNS DICK.